US010762342B2

(12) United States Patent
Sugiura

(10) Patent No.: US 10,762,342 B2
(45) Date of Patent: Sep. 1, 2020

(54) ELECTRONIC APPARATUS, METHOD, AND PROGRAM

(71) Applicant: Toshiba Client Solutions CO., LTD., Koto-ku, Tokyo (JP)

(72) Inventor: Chikashi Sugiura, Hamura Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 390 days.

(21) Appl. No.: 15/581,604

(22) Filed: Apr. 28, 2017

(65) Prior Publication Data

US 2017/0236004 A1    Aug. 17, 2017

Related U.S. Application Data

(63) Continuation of application No. PCT/JP2014/078939, filed on Oct. 30, 2014.

(51) Int. Cl.
*G06K 9/00* (2006.01)
*G06F 17/24* (2006.01)

(52) U.S. Cl.
CPC ....... *G06K 9/00422* (2013.01); *G06F 17/242* (2013.01); *G06K 9/00416* (2013.01); *G06K 9/00436* (2013.01); *G06K 9/00469* (2013.01)

(58) Field of Classification Search
CPC .. G06K 9/00; G06K 9/00416; G06K 9/00436; G06K 9/00469; G06K 2209/01; G06K 9/00442; G06K 9/00463; G06K 9/344; G06K 9/186; G06F 17/242; G06F 16/5846; G06F 17/289
See application file for complete search history.

(56) References Cited

U.S. PATENT DOCUMENTS

| 5,438,631 | A | * | 8/1995 | Dai | G06K 9/00416 382/197 |
|---|---|---|---|---|---|
| 5,812,697 | A | | 9/1998 | Sakai et al. | |
| 7,077,319 | B2 | * | 7/2006 | Schnee | G06K 7/10732 235/462.1 |
| 7,098,896 | B2 | * | 8/2006 | Kushler | G06F 3/04883 345/168 |
| 7,215,815 | B2 | | 5/2007 | Honda | |
| 9,025,878 | B2 | | 5/2015 | Hlrabayashi | |

(Continued)

FOREIGN PATENT DOCUMENTS

JP    H07-302306 A    11/1995
JP    H07-334622 A    12/1995
(Continued)

OTHER PUBLICATIONS

International Search Report and Written Opinion mailed by Japan Patent Office dated Jan. 27, 2015 in the corresponding PCT application No. PCT/JP2014/078939.

*Primary Examiner* — Manav Seth
(74) *Attorney, Agent, or Firm* — Knobbe, Martens, Olson & Bear, LLP

(57) ABSTRACT

According to one embodiment, an electronic apparatus performs a character recognition process, uses, if a stroke in a first area of the first handwritten document and a stroke in a second area are the same, a character recognition result of the first handwritten document, and performs, if a stroke in the first area and a stroke in the second area are different, the character recognition process for the second area including the different stroke.

11 Claims, 8 Drawing Sheets

(56) References Cited

U.S. PATENT DOCUMENTS

2002/0071607 A1\* 6/2002 Kawamura ............ G06K 9/222
                                                              382/187
2003/0185444 A1    10/2003 Honda
2009/0180698 A1\* 7/2009 Ramani ................ G06K 9/2063
                                                              382/219
2014/0079317 A1    3/2014 Hirabayashi

FOREIGN PATENT DOCUMENTS

| JP | H08-055182 A  | 2/1996 |
| JP | 2001-229179 A | 8/2001 |
| JP | 2003-208416 A | 7/2003 |
| JP | 2014-059808 A | 4/2014 |

\* cited by examiner

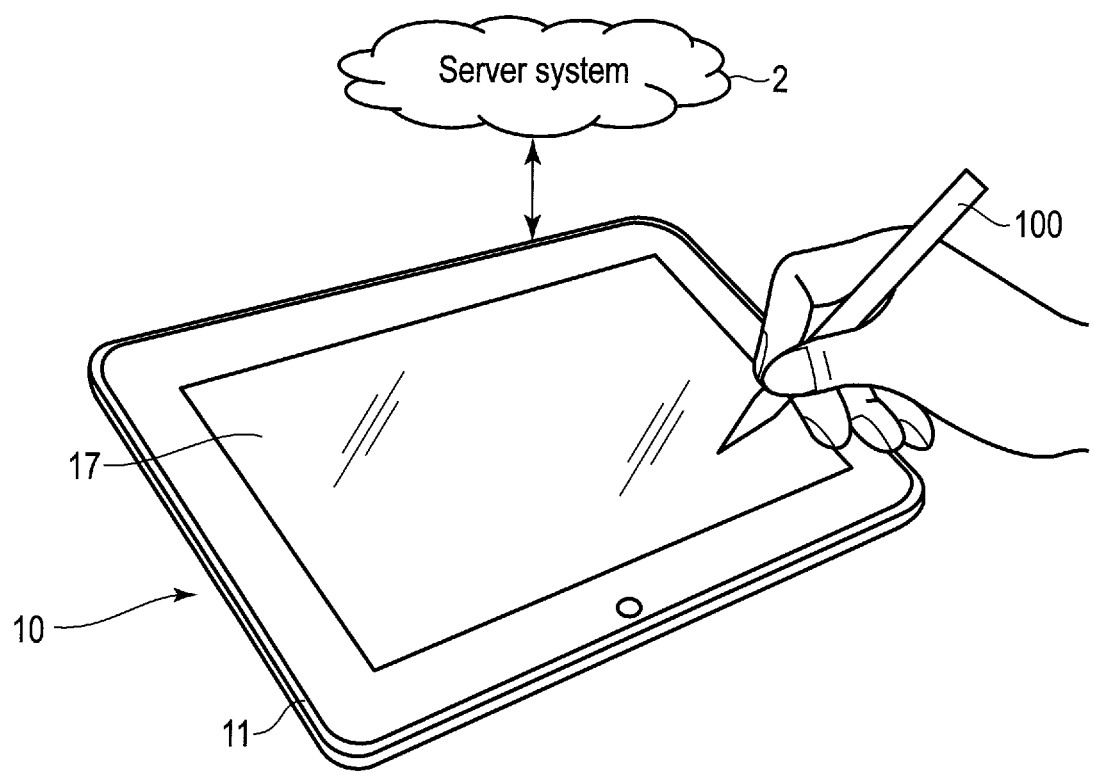
F I G. 1
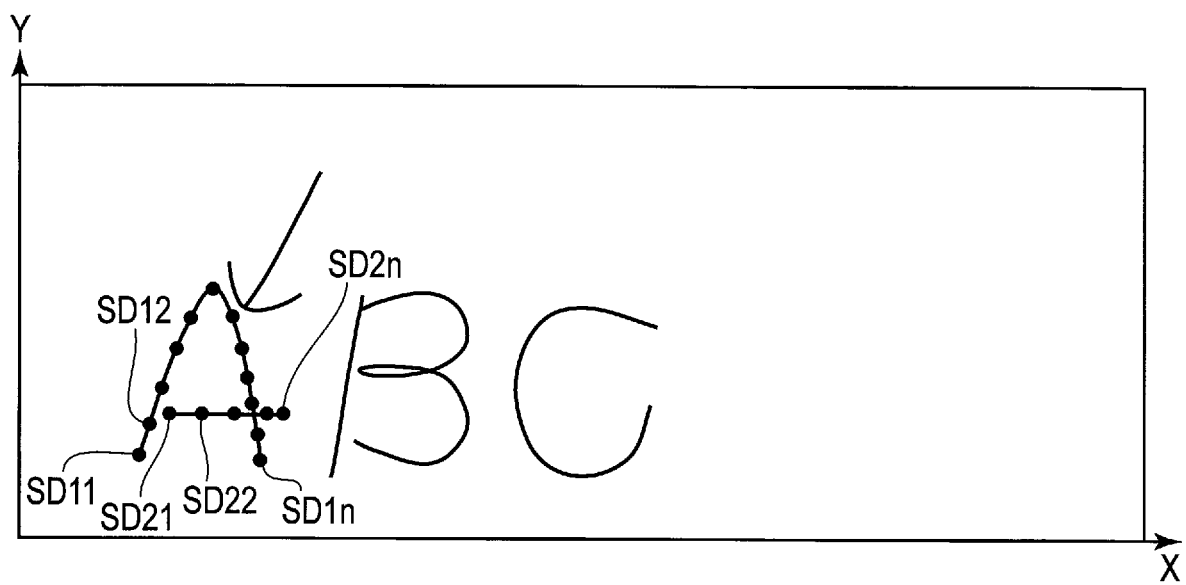
F I G. 2

|   | 400 | | 400A |
|---|---|---|---|

|   | | | | |
|---|---|---|---|---|
| ∧<br>1<br>3<br>C<br>/ | SD1 { | SD11<br>SD12<br>⋮<br>SD1n | X11, Y11, T11<br>X12, Y12, T12<br>⋮<br>X1n, Y1n, T1n | |
| | | | | A ------- |
| | SD2 { | SD21<br>SD22<br>⋮<br>SD2n | X21, Y21, T21<br>X22, Y22, T22<br>⋮<br>X2n, Y2n, T2n | |
| | SD3 { | SD31<br>SD32<br>⋮<br>SD3n | X31, Y31, T31<br>X32, Y32, T32<br>⋮<br>X3n, Y3n, T3n | B ------- |
| | SD4 { | SD41<br>SD42<br>⋮<br>SD4n | X41, Y41, T41<br>X42, Y42, T42<br>⋮<br>X4n, Y4n, T4n | |
| | SD5 { | SD51<br>SD52<br>⋮<br>SD5n | X51, Y51, T51<br>X52, Y52, T52<br>⋮<br>X5n, Y5n, T5n | C ------- |
| | SD6 { | SD61<br>SD62<br>⋮<br>SD6n | X61, Y61, T61<br>X62, Y62, T62<br>⋮<br>X6n, Y6n, T6n | ⋮ ⋮ |
| | SD7 { | SD71<br>SD72<br>⋮<br>SD7n | X71, Y71, T71<br>X72, Y72, T72<br>⋮<br>X7n, Y7n, T7n | |

F I G. 3

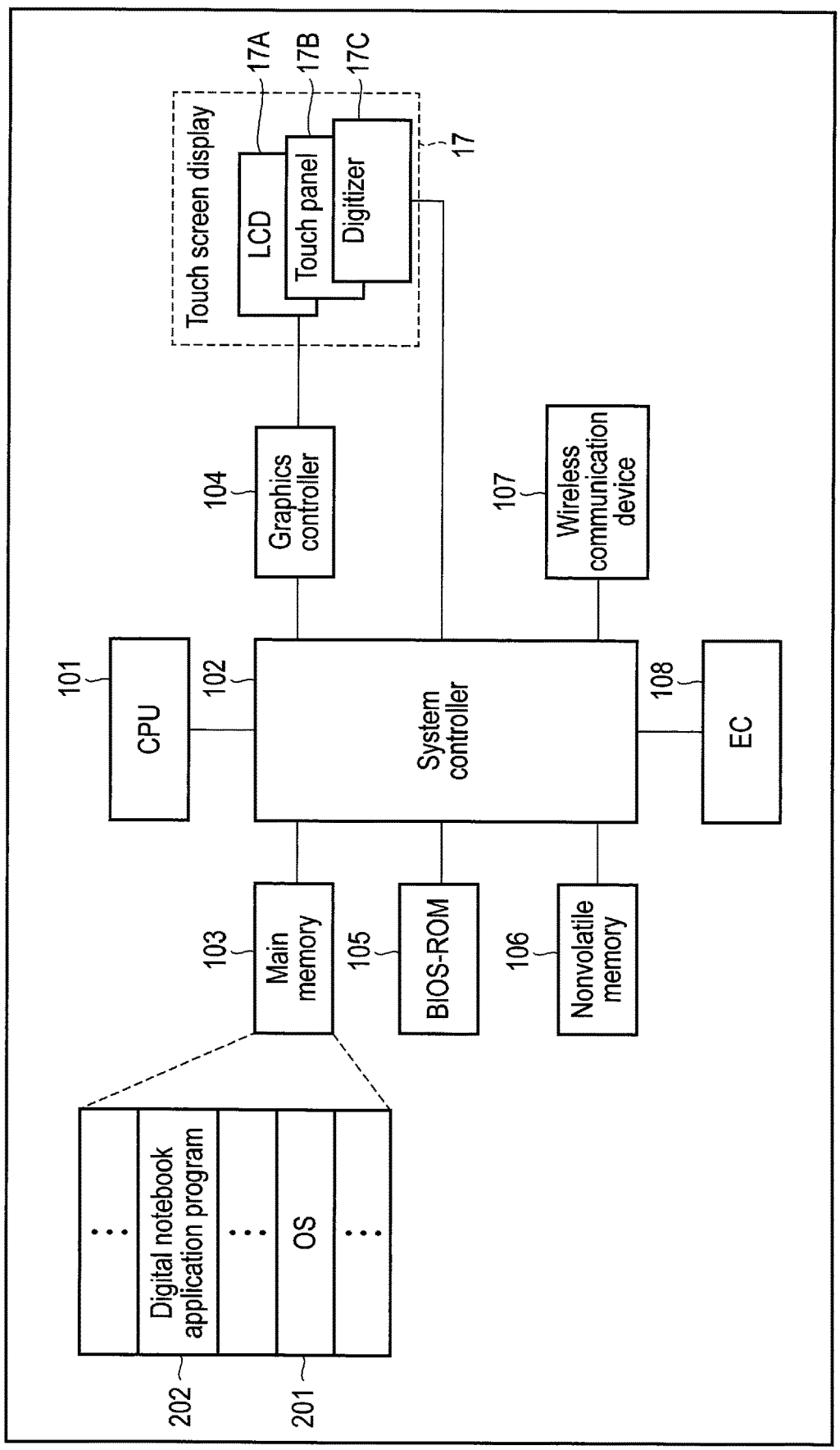
F I G. 4

(1)Market trend
(1-1)Market size and sales
Market size of the apparatus in the 2014 fiscal year is expected as about 300 million dollars. A share of our company is considered about 20%. 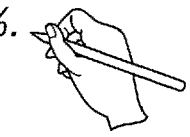

FIG. 7A (1)Market trend
(1-1)Market size and sales
Market size of the apparatus in the 2014 fiscal year is expected as about 300 million dollars. Since a share of our company is considered about 20%, marketing planning should be decided base on this sales. 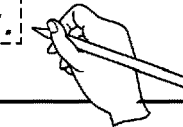

FIG. 7B

ELECTRONIC APPARATUS, METHOD, AND PROGRAM

CROSS-REFERENCE TO RELATED APPLICATIONS

This application is a Continuation application of PCT Application No. PCT/JP2014/078939, filed Oct. 30, 2014, the entire contents of which are incorporated herein by reference.

FIELD

Embodiments described herein relate generally to a technique of inputting characters by handwriting.

BACKGROUND

In recent years, various electronic apparatuses such as tablets, PDAs, and smart phones have been developed. In conventional electronic apparatuses, characters and commands have been input by inputting codes representing the characters and the commands, using keyboards, mouses, etc. In recent years, the electronic apparatuses have been provided with touch screen displays to facilitate the input. Characters, figures, commands, etc., can be input by handwriting them on screens or touching the screens.

A handwritten document is saved, not as image data, but as stroke data indicating coordinates on sampling points of each stroke constituting a character and the order of strokes (the order in which they were handwritten). At the time of retrieval, when a query stroke is handwritten, stroke data including a stroke having a similar feature to that of the query stroke is detected. However, in some cases, the character recognition of a handwritten document is performed, and a recognition result is saved with stroke data so that retrieval also can be conducted based on character codes (text data) as in a normal document processor. In general, character recognition is performed when a handwritten document is saved. Saving a handwritten document includes saving a new document, reading a handwritten document that has been once created and saved, and overwriting and saving it after edition. In the latter case of overwrite save, although the handwritten document after edition includes the same portion as the handwritten document before edition (already recognized portion), and character recognition of the whole document is performed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an outside of an electronic apparatus according to an embodiment.

FIG. 2 is a diagram showing an example of a handwritten document handwritten on a touch screen display.

FIG. 3 is a diagram showing an example of a handwritten document data, which is a set of stroke data.

FIG. 4 is an exemplary block diagram showing a system configuration of the electronic apparatus.

FIG. 7A is a diagram showing an example of a handwritten document before edition.

FIG. 7B is a diagram showing an example of a handwritten document after edition.

DETAILED DESCRIPTION

Figure 5:
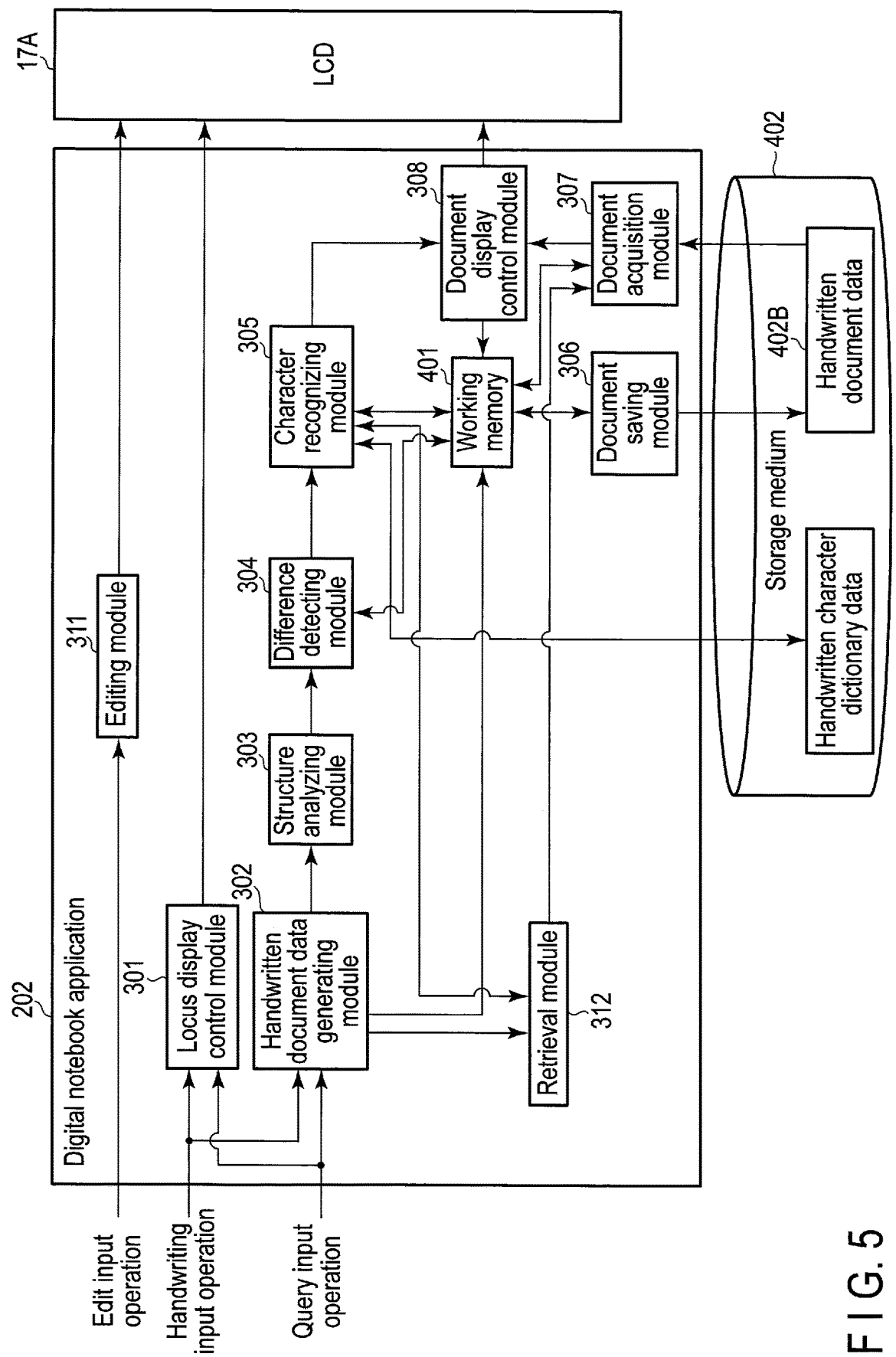
FIG. 5 is an exemplary block diagram showing a functional configuration of a digital notebook application program executed by the electronic apparatus.

Various embodiments will be described hereinafter with reference to the accompanying drawings.

In general, according to one embodiment, an electronic apparatus performs a character recognition process for strokes in a handwritten document. The electronic apparatus is configured to:

compare a first handwritten document and a second handwritten document, wherein the first handwritten document comprises first areas, each of the first areas comprises strokes, the character recognition process for the first handwritten document is performed at a first time, the second handwritten document is created by editing the first handwritten document and comprises second areas, each of the second areas comprises strokes, and the character recognition process for the second handwritten document is performed at a second time later than the first time;

use, when a stroke in at least one of the first areas and a stroke in at least one of the second areas are same, at least a part of a character recognition result of at least one of the first area of the first handwritten document when performing the character recognition process of the second area excluding the at least one of the second areas comprising the same stroke; and perform, when a stroke in at least one of the first areas and a stroke in at least one of the second areas are different, the character recognition process for the second area including the different stroke.

FIG. 1 is a perspective view showing an example of an outside of an electronic apparatus according to an embodiment. The electronic apparatus is, for example, a stylus-based portable electronic apparatus wherein handwriting input can be performed with a stylus or a finger. The electronic apparatus can be implemented as a tablet computer, a notebook personal computer, a smart phone, a PDA, or the like. The case where the electronic apparatus is implemented as a tablet computer 10 will be herein described. The tablet computer 10 is a portable electronic apparatus, which is also called a tablet or slate computer. A main body 11 includes a housing in the shape of a thin box.

A touch screen display 17 is installed to be laid on the upper surface of the main body 11. The touch screen display 17 includes a flat panel display and a sensor configured to detect a contact position of a stylus or a finger on a screen of the flat panel display. The flat panel display may be, for example, a liquid crystal display (LCD). As the sensor, for example, a capacitive touch panel or an electromagnetic induction type digitizer can be used. The case where both kinds of sensor, that is, the digitizer and the touch panel, are incorporated in the touch screen display 17 is herein described. Thus, the touch screen display 17 can detect a touch operation on the screen with a stylus 100, as well as a touch operation on the screen with a finger.

The stylus 100 may be, for example, a digitizer stylus (electromagnetic induction stylus). A user can perform a handwriting input operation on the touch screen display 17 with the stylus 100 (stylus input mode). In the stylus input mode, loci of movements of the stylus 100 on the screen, that is, strokes handwritten by a handwriting input operation, are obtained, and based thereon, characters input by handwriting are displayed on the screen. The locus of the movement of the stylus 100 formed while the stylus 100 contacts the screen corresponds to one stroke. Strokes constitute a character, a symbol, etc. Many sets of strokes corresponding to handwritten characters, handwritten figures, handwritten tables, etc., constitute a handwritten document. A handwritten document can include pages.

In the embodiment, a handwritten document is saved on a storage medium, not as image data, but as handwritten document data indicating a string of coordinates constituting each stroke and the order of strokes (the order in which they were handwritten). A handwritten document data represents a set of time-series stroke data corresponding to strokes, respectively. Each stroke data corresponds to one stroke, and includes a series of coordinate data (time-series coordinates) corresponding to respective points on the stroke. The order in which the stroke data are arranged corresponds to the order in which the respective strokes were handwritten. A handwritten document data is accompanied also with a character code (text data), which is a result of character recognition of a character corresponding to one or more stroke data.

The tablet computer 10 is capable of reading an existing arbitrary handwritten document data from the storage medium, and displaying a handwritten document corresponding to the read handwritten document data, that is, strokes indicated by the handwritten document data, on the screen. The strokes indicated by the handwritten document data are also strokes input by handwriting.

The tablet computer 10 has a network communication function, and is capable of cooperating with other personal computers, a server system 2 on the Internet, etc. That is, the tablet computer 10 includes a wireless communication device of a wireless LAN, etc., and is capable of wirelessly communicating with other personal computers. Moreover, the tablet computer 10 is also capable of communicating with the server system 2 on the Internet. The server system 2 is a system for sharing various items of information, and performs an on-line storage service and various other cloud computing services. The server system 2 can be implemented as one or more server computers.

The server system 2 includes a large-capacitance storage medium such as a hard disk drive (HDD). The tablet computer 10 is capable of transmitting a handwritten document data to the server system 2 through a network, and storing it in the storage medium of the server system 2 (upload). To establish secure communication between the tablet computer 10 and the server system 2, the server system 2 may authenticate the tablet computer 10 when starting communication. In this case, a dialog prompting the user to input an ID or a password may be displayed on the screen of the tablet computer 10, or the ID of the tablet computer 10, etc., may be automatically transmitted from the tablet computer 10 to the server system 2.

The tablet computer 10 is thereby capable of handling a number of handwritten document data or a large-capacitance handwritten document data, even if the capacity of storage of the tablet computer 10 is small.

Moreover, the tablet computer 10 is capable of reading one or more arbitrary handwritten document data stored in the storage medium of the server system 2 (download), and displaying the respective loci of strokes indicated by the read one or more handwritten document data on the screen of the display 17 of the tablet computer 10. In this case, a list of thumbnails (thumbnail images) obtained by reducing the size of the pages of the handwritten document data may be displayed on the screen of the display 17, or one page selected from the thumbnails may be displayed on the screen of the display 17 in a normal size.

In this manner, in the present embodiment, the storage medium in which handwritten document data is stored may be any one of the storage of the tablet computer 10 and the storage of the server system 2. The user of the tablet computer 10 can store an arbitrary handwritten document data in an arbitrary storage selected from the storage of the tablet computer 10 and the storage of the server system 2.

Next, a relationship between strokes handwritten by the user (handwritten characters, marks, figures, tables, etc.) and handwritten document data will be described with reference to FIG. 2 and FIG. 3. FIG. 2 shows an example of a document handwritten on the touch screen display 17 with the stylus 100 or the like.

Generally, in many cases, a character, a figure or the like is once handwritten in a document, and then another character, figure or the like is further handwritten thereon. In FIG. 2, it is assumed that characters "A", "B", and "C" are handwritten in this order, and then, an arrow is handwritten close to the handwritten character "A".

The handwritten character "A" is represented by two strokes (a locus in the shape of "Λ" and a locus in the shape of "-") handwritten with the stylus 100 or the like, that is, two loci. The locus in the shape of "Λ" of the stylus 100, which is first handwritten, is sampled in real time, for example, at regular time intervals. Time-series coordinates $SD11, SD12, \ldots, SD1n$ of the stroke in the shape of "Λ" are thereby obtained. Similarly, the locus in the shape of "-" of the stylus 100, which is next handwritten, is also sampled. Time-series coordinates $SD21, SD22, \ldots, SD2n$ of the stroke in the shape of "-" are thereby obtained.

The handwritten character "B" is represented by two strokes handwritten with the stylus 100 or the like, that is, two loci. The handwritten character "C" is represented by one stroke handwritten with the stylus 100 or the like, that is, one locus. The handwritten arrow is represented by two strokes handwritten with the stylus 100 or the like, that is, two loci.

FIG. 3 shows a handwritten document data 400 corresponding to the document of FIG. 2. The handwritten document data 400 includes stroke data SD1, SD2, . . . SD7. In the handwritten document data 400, the stroke data SD1, SD2, . . . , SD7 are chronologically arranged in a stroke order, that is, the order in which strokes were handwritten.

In the handwritten document data 400, the first and second stroke data SD1 and SD2 represent the two strokes of the handwritten character "A", respectively. The third and fourth stroke data SD3 and SD4 represent the two strokes constituting the handwritten character "B", respectively. The fifth stroke data SD5 represents the one stroke constituting the handwritten character "C". The sixth and seventh stroke data SD6 and SD7 represent the two strokes constituting the handwritten arrow, respectively.

Each stroke data includes a series of coordinate data (time-series coordinates) corresponding to one stroke, that is, coordinates corresponding to respective points on the one stroke. In each stroke data, coordinates are chronologically arranged in the order in which strokes were written. For example, regarding the handwritten character "A", the stroke data SD1 includes a series of coordinate data (time-series coordinates) corresponding to respective points on the stroke in the shape of "Λ" of the handwritten character "A", that is, the n coordinate data SD11, SD12, ..., SD1n. The stroke data SD2 includes a series of coordinate data corresponding to respective points on the stroke in the shape of "-" of the handwritten character "A", that is, the n coordinate data SD21, SD22, ..., SD2n. The number of coordinate data may vary from stroke to stroke.

Each coordinate data indicates x- and y-coordinates corresponding to a certain point on a stroke. For example, the coordinate data SD11 indicates an x-coordinate "X11" and a y-coordinate "Y11" of a start point of the stroke in the shape of "Λ". SD1n indicates an x-coordinate "X1n" and a y-coordinate "Y1n" of an end point of the stroke in the shape of "Λ".

Moreover, each coordinate data may include a timestamp data T corresponding to a point in time when a point corresponding to the coordinates was handwritten. The point in time when the point was handwritten may be an absolute time (for example, year, month, day, hour, minute, and second) or a relative time determined with respect to a certain point in time. For example, an absolute time (for example, year, month, day, hour, minute, and second) when a stroke started being written may be added to each stroke data as a timestamp data, and a relative time indicating a difference from the absolute time may be further added to each coordinate data in a stroke data as a timestamp data T. A temporal relationship between strokes can be more accurately indicated by using a handwritten document data with a timestamp data T added to each coordinate data. Timestamp data T can be used to detect whether a handwritten document is edited or not.

Moreover, although not shown in FIG. 3, each coordinate data may include pressure applied because of the contact of an external object (for example, the stylus 100) with the screen at a point in time when a point corresponding to the coordinates was handwritten.

Moreover, a handwritten document data is accompanied also with a character code (text data) 400A, which is a result of character recognition of a character corresponding to a stroke data. The handwritten character composed of the stroke data SD1 and SD2 is recognized as "A", the handwritten character composed of the third and fourth stroke data SD3 and SD4 is recognized as "B", and the handwritten character composed of the fifth stroke data SD5 is recognized as "C". The sixth and seventh stroke data SD6 and SD7 are not recognized as a handwritten character, but recognized as a figure.

In the present embodiment, as described above, handwritten strokes are stored, not as an image or a character recognition result, but as the handwritten document data 400 composed of a set of time-series stroke data. Thus, handwritten characters and figures can be handled without depending on languages. Therefore, the structure of the handwritten document data 400 of the present embodiment can be commonly used in various countries around the world where different languages are used.

FIG. 4 is a diagram showing a system configuration of the tablet computer 10.

The tablet computer 10 includes a CPU 101, a system controller 102, a main memory 103, a graphics controller 104, a BIOS-ROM 105, a nonvolatile memory 106, a wireless communication device 107, an embedded controller (EC) 108, etc.

The CPU 101 is a processor which controls the operation of various components in the tablet computer 10. The CPU 101 executes various software programs loaded from the nonvolatile memory 106, which is a storage device, into the main memory 103. These software programs include an operating system (OS) 201 and various application programs. The application programs include a digital notebook application program 202. The digital notebook application program 202 has also the function of performing character recognition of a handwritten character corresponding to a handwritten document data and the function of retrieving a handwritten document data, in addition to the above-described function of creating handwritten document data from a handwritten stroke.

The CPU 101 also executes a Basic Input/Output System (BIOS) stored in the BIOS-ROM 105. The BIOS is a program for hardware control.

The system controller 102 is a device which connects a local bus of the CPU 101 and various components. The system controller 102 also includes a memory controller which executes access control over the main memory 103. The system controller 102 has also the function of communicating with the graphics controller 104 through a serial bus conforming to the PCI EXPRESS standard, etc.

The graphics controller 104 is a display controller which controls an LCD 17A used as a display monitor of the tablet computer 10. A display signal generated by the graphics controller 104 is transmitted to the LCD 17A. The LCD 17A displays a screen image based on the display signal. A touch panel 17B and a digitizer 17C are disposed on the LCD 17A. The touch panel 17B is a capacitive pointing device for performing input on a screen of the LCD 17A. A contact position on the screen which a finger contacts, a movement of the contact position, etc., are detected by the touch panel 17B. The digitizer 17C is an electromagnetic introduction type pointing device for performing input on the screen of the LCD 17A. The contact position on the screen which the stylus 100 contacts, a movement of the contact position, contact pressure, etc., are detected by the digitizer 17C.

The wireless communication device 107 is a device configured to perform wireless communication such as wireless LAN or 3G mobile communication. The EC 108 is a single-chip microcomputer including an embedded controller for power management. The EC 108 has the function of powering on or off the tablet computer 10 in accordance with a user's operation of a power button.

Next, a functional configuration of the digital notebook application program 202 will be described with reference to FIG. 5. The digital notebook application program 202 recognizes a character composed of one or more strokes corresponding to handwritten document data displayed on the touch screen display 17. The handwritten document data displayed on the touch screen display 17 includes a handwritten document data that is being newly created, and a handwritten document data which was once saved on a storage medium 402 after being newly created, was read from the storage medium 402, and is being edited.

The digital notebook application program 202 includes, for example, a locus display control module 301, a handwritten document data generating module 302, a structure analyzing module 303, a difference detecting module 304, a character recognizing module 305, a document saving module 306, a document acquisition module 307, a document display control module 308, an editing module 311, a retrieval module 312, etc.

The touch screen display 17 is configured to detect the occurrence of events such as "touch", "move (slide)", and "release". The "touch" event is an event indicating that an external object has contacted the screen. The "move (slide)" event is an event indicating that the contact position has been moved while the external object contacts the screen. The "release" event is an event indicating the external object has released from the screen.

The locus display control module 301 and the handwritten document data generating module 302 receive the "touch", "move (slide)" or "release" event generated by the touch screen display 17, thereby detecting a handwriting input operation. The "touch" event includes a coordinate of a contact position. The "move (slide)" event includes a coordinate of the contact position which has been moved. The "release" event includes a coordinate of the position where the contact position is released from the screen. Accordingly, the locus display control module 301 and the handwritten document data generating module 302 receive a coordinate string corresponding to the locus of the movement of the contact position from the touch screen display 17.

The locus display control module 301 controls display of one or more strokes input by handwriting on the screen of the touch screen display 17. The locus display control module 301 receives a coordinate string from the touch screen display 17, and based on the coordinate string, controls display of the locus of each stroke handwritten by a handwriting input operation with the stylus 100 or the like on the screen of the LCD 17A in the touch screen display 17. By the locus display control module 301, the locus of the stylus 100 formed while the stylus 100 contacts the screen, that is, a stroke, is drawn on the screen of the LCD 17A.

The editing module 311 is capable of changing the type (color, size, etc.) of the stylus for a handwritten document displayed on the screen of the LCD 17A. Moreover, the editing module 311 is also capable of displaying an eraser on the handwritten document and moving the eraser, thereby partly erasing the handwritten document per stroke. Furthermore, the editing module 311 is also capable of copying at least a part of the handwritten document into a clipboard and pasting it onto other points in the same document or other documents. Moreover, the editing module 311 is also capable of exporting at least a part of the handwritten document to other applications and importing an image from other applications. An erasure history of the eraser indicating when and which stroke was erased may be stored in the storage medium 402 together with a handwritten document data 402B. The erasure history is composed of, for example, an erasure time t and an erased stroke data SD. The erasure history can be used to detect whether the handwritten document is edited or not.

The handwritten document data generating module 302 receives the above-described coordinate string output from the touch screen display 17, and generates a handwritten document data having the structure described in detail with reference to FIG. 3 on the basis of the coordinate string. In this case, the handwritten document data, that is, coordinates corresponding to respective points on a stroke and timestamp data, may be temporarily saved on a working memory 401. The handwritten document data generating module 302 outputs the generated handwritten document data to the structure analyzing module 303.

The structure analyzing module 303 analyzes the structure of a displayed handwritten document, and if the document includes pages, detects a predetermined area, for example, a row, from each page and divides a handwritten document data on each page into handwritten document data on respective rows. The structure analyzing module 303, for example, determines that strokes are included in one row, if the strokes adjacent each other in a chronological order are within a threshold range. Pages may be divided, not only into rows, but also into paragraphs, which are larger areas, or into words or characters, which are smaller areas. The areas are units according to which the difference detecting module 304 detects differences, and character recognition is performed for difference areas. Thus, as the areas are smaller, the areas for which character recognition is performed can be correctly perceived, and the throughput of character recognition can be minimized. However, on the other hand, a detection process takes a lot of time and power consumption increases. Thus, the size of the areas is determined according to various requests.

The difference detecting module 304 detects an area differing between a handwritten document before edition and a handwritten document after edition (difference row). The working memory 401 stores handwritten document data before and after edition. Tables 1 and 2 show the storage content of the working memory 401.

TABLE 1

| | Before edition (t = $t_1$) | | |
|---|---|---|---|
| Row | Stroke data | Hash value | Text data |
| 1 | ******** | $H_1$ | $C_1(t_1)$ |
| 2 | ******** | $H_2$ | $C_2(t_1)$ |
| 3 | ******** | $H_3$ | $C_3(t_1)$ |
| ... | ... | ... | ... |

TABLE 2

| | After edition (t = $t_2$) | | | |
|---|---|---|---|---|
| Row | Stroke data | Hash value | Hash value comparison | Text data |
| 1 | ******** | $H_1$ | Correspondence | $C_1(t_2)(=C_1(t_1))$ |
| 2 | ******** | $H_2$ | Correspondence | $C_2(t_2)(=C_2(t_1))$ |
| 3 | ******** | $H_{98}$ | Noncorrespondence | $C_{3,4}(t_2)$ |
| ... | ... | ... | ... | ... |

A handwritten document data is composed of a stroke data on each row, a hash value corresponding thereto, and text data, which is a character recognition result. Text data $C_i(t_1)$ and $C_i(t_2)$ indicate character recognition results of a stroke data in an i-th row of the handwritten document data at times $t_1$ and $t_2$ ($t_2$ is later than $t_1$), respectively. Hash values are obtained by performing an operation on the stroke data on each row, using a hash function that is an irreversible one-way function. Thus, the correspondence or noncorrespondence of handwritten document data on each row can be detected based on the hash value. The correspondence (noncorrespondence) of the hash values of the handwritten document data before and after edition means that the handwritten document data before and after edition are the same (different). Thus, a row, the hash values of which correspond to each other, is an unchanged row, and it is unnecessary to perform character recognition again. The difference detecting module 304 compares the hash values of the handwritten document data before and after edition, detects whether they correspond to each other or not, and writes a result thereof to the handwritten document data after edition.

When performing character recognition of the handwritten document after edition, the character recognizing module 305 performs character recognition of only a row, the hash values of which are different between the handwritten documents before and after edition, again, and uses a character recognition result of the handwritten document data before edition for a row, the hash values of which are the same. For character recognition, a handwritten character dictionary data 402A in the storage medium 402 is used. It should be noted that characters are sometimes edited by being deleted with strike-through instead of being erased with an eraser. To distinguish between strike-through and characters, the character recognizing module 305 does not regard a predetermined length or more of stroke as a part of a character, and excludes it from an object to be recognized. Then, only a part of the character without strike-through is regarded as an object to be recognized.

In this manner, the re-recognition of an already recognized portion is omitted, whereby a processing time of character recognition is shortened and power consumption is lowered. As shown in Tables 1 and 2, the document saving module 306 saves the handwritten document data 402B composed of a stroke data on each row and a text code in the storage medium.

Difference areas may be detected, not only by using hash values, but also by using other methods. For example, as shown in FIG. 3, the handwritten document data includes timestamp data T corresponding to a point in time when a point corresponding to coordinates constituting a stroke was written. In general, adjacent coordinates are input chronologically continuously. On the other hand, an edited portion is handwritten more recently than other portions and they are chronologically discontinuous. Thus, if a coordinate portion including timestamp data T indicating a recent time which is not continuous with those of the other portions is found, it can be determined that a stroke, a character, a word, a row, or the like including the coordinate portion has been edited, and the stroke, the character, the word, the row, or the like may be detected as a difference area.

In addition, if an erased stroke is detected based on an operation history of an eraser stored in the storage medium 402 with the handwritten document data 402B, it can be determined that the stroke has been edited in a previous handwritten document, and the stroke may be detected as a difference area.

The retrieval module 312 supplies a query stroke generated by the handwritten document data generating module 302 to the document acquisition module 307, based on a query input operation. The document acquisition module 307 retrieves a handwritten document including a stroke corresponding to the query stroke from the storage medium 402. In the retrieval, pattern matching based on a feature amount of stroke data, a character recognition result, or both of them may be used.

Figure 6:
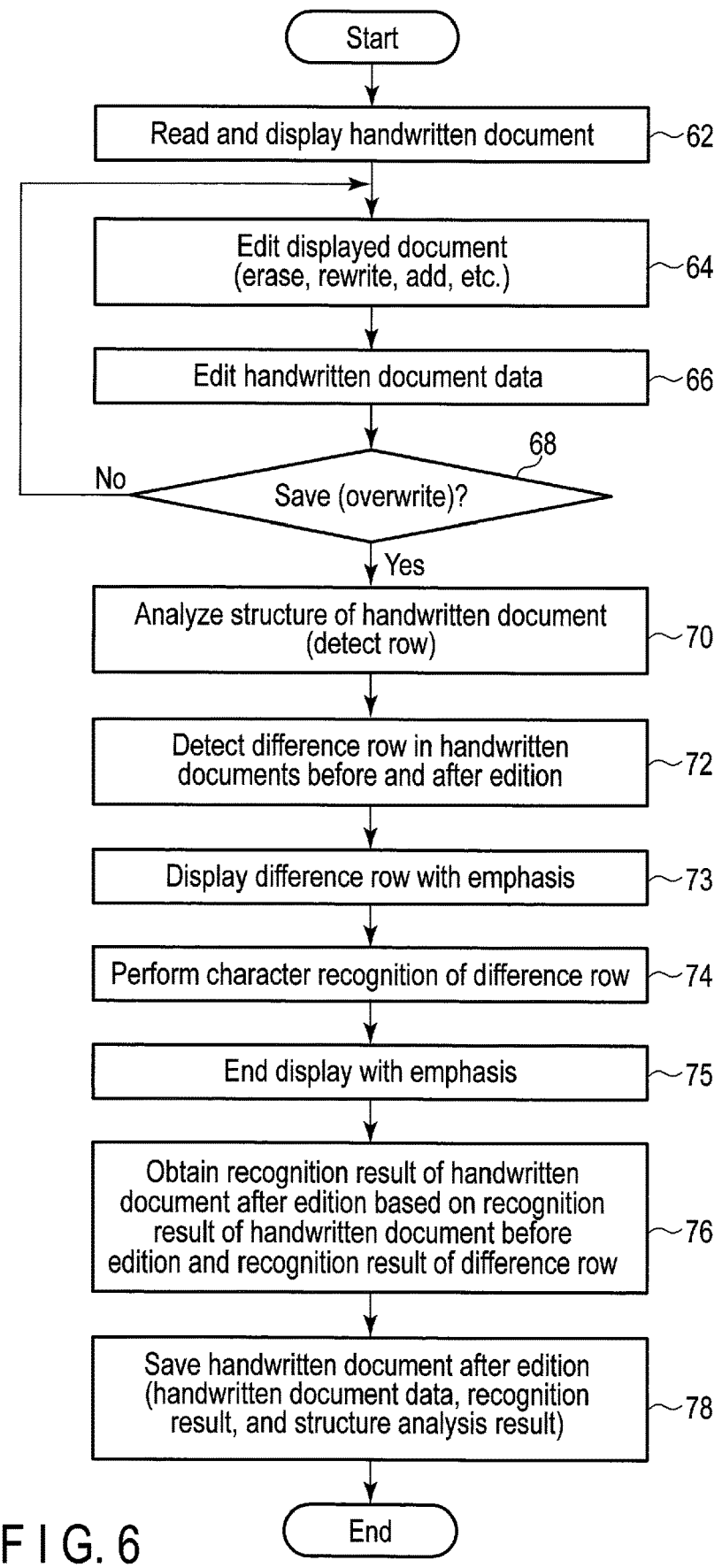
FIG. 6 is a flowchart showing an example of a handwriting input process of the embodiment.

Next, an example of character recognition will be described with several examples of handwritten document data before and after edition. FIG. 6 is a flowchart showing an example of an operation of reading the handwritten document data 402B saved on the storage medium 402, displaying it on the LCD 17A, editing a displayed handwritten document, and overwriting and saving it. In this case, character recognition is performed once just before save. However, character recognition may be performed periodically while the handwritten document is being displayed or whenever the handwritten document is edited.

In block 62, the document acquisition module 307 causes the LCD 17A to display a menu not shown in the figures, causes the user to designate a desired document from the menu, and reads a desired handwritten document data from the storage medium 402. The document display control module 308 causes the LCD 17A to display the read handwritten document. As shown in Table 1, the read handwritten document data is also stored in the working memory 401 as handwritten document data before edition. The handwritten document data before edition is composed of stroke data on each row, a hash value, and text data. A handwritten document stored in the storage medium 402 is a handwritten document after edition before it is read, but is a handwritten document before edition after it is read. If the handwritten document includes pages, one designated page is displayed. A displayed page can be switched. In block 64, the handwritten document is edited. An editing process of erasing a part with an eraser and rewriting it, keeping an existing document as it is and adding writing thereto, etc., is performed.

In block 66, the handwritten document data generating module 302 modifies the handwritten document data in accordance with an edition of a stroke. The edited handwritten document data is supplied to the structure analyzing module 303. In block 68, it is determined whether an instruction to save (overwrite and save) the handwritten document after edition has been given. As in the case of reading, a save instruction is also given from the menu not shown in the figures. Until the save instruction is given, blocks 64 and 66 are repeated.

When the save instruction is given, the structure analyzing module 303 analyzes the structure of each page of the (present) handwritten document after edition and divides each page of the handwritten document data into rows in block 70. In block 72, the difference detecting module 304 obtains the hash values of the stroke data on each row in the handwritten documents before and after edition, and detects a difference row. As shown in Table 2, a detection result is written to the working memory 401 as an attribute of the handwritten document data after edition. In block 73, the document display control module 308 makes the display mode of the row which is different from that in the handwritten document before edition different from that of the other portions in the handwritten document after edition, which is presently displayed.

FIG. 7A and FIG. 7B are examples of the handwritten documents before and after edition. The following handwritten document shown in FIG. 7A is a handwritten document before edition read from the storage medium 402 in block 62:

"(1) Market trend (1-1) Market size and sales

Market size of the apparatus in the 2014 fiscal year is expected as about 300 million dollars. A share of our company is considered about 20%."

On the other hand, FIG. 7B shows the handwritten document in which "A share of our company is considered about 20%." was changed to "Since a share of our company is considered about 20%, marketing planning should be decided base on this sales." in block 64. As shown in FIG. 7B, when the handwritten document after edition is displayed, an edited portion is displayed in a display mode different from that of the other portions. The different display mode includes, for example, enclosing the portion in a broken line, flashing it, making a change in brightness, color, thickness or the like, but is not limited to these. The different display mode may be any modes that can be distinguished from others.

In block 74, the character recognizing module 305 performs character recognition of only the row, the hash values of which are different between the handwritten documents before and after edition. When the character recognition is complete, the document display control module 308 causes the display mode of the difference row to return to the original display mode in block 75. That is, the display mode of the difference row is set to the same display mode as that of the other portions. In block 76, the character recognizing module 305 obtains a recognition result of the handwritten document data after edition, using a character recognition result of the difference row and a character recognition result of the handwritten document data before edition on those other than the difference row. In the example of Tables 1 and 2, the hash values of the first and second rows of the handwritten document after edition are the same as those of the first and second rows of the handwritten document before edition, and the hash value of the third row differs from that of the third row of the handwritten document before edition. Therefore, it is unnecessary to recognize the first and second rows again. Recognition results $C_1$ $(t_1)$ and $C_2$ $(t_1)$ of the handwritten document before edition can be used as recognition results $C_1$ $(t_2)$ and $C_2$ $(t_2)$ of the handwritten document after edition. However, regarding the third row, stroke data has been changed by edition, and thus, a re-recognition result $C_{3A}$ $(t_2)$ is used.

In block 78, the document saving module 306 overwrites and saves the handwritten document data after edition on the storage medium 402. As shown in Table 2, the handwritten document data after edition is composed of stroke data, a hash value, a result of comparison with a hash value before edition, and a text data on each row In this manner, when a saved handwritten document is read, and is overwritten and saved after edition, a recognition result before edition is used for the same portion as that before edition. Only a portion differing from that before edition is recognized, and saved with the handwritten document after edition as a recognition result after edition. Thus, the duplicated recognition of the same stroke as that before edition can be omitted, which leads to a reduction in processing time of recognition and a saving of power consumption.

Figure 8:
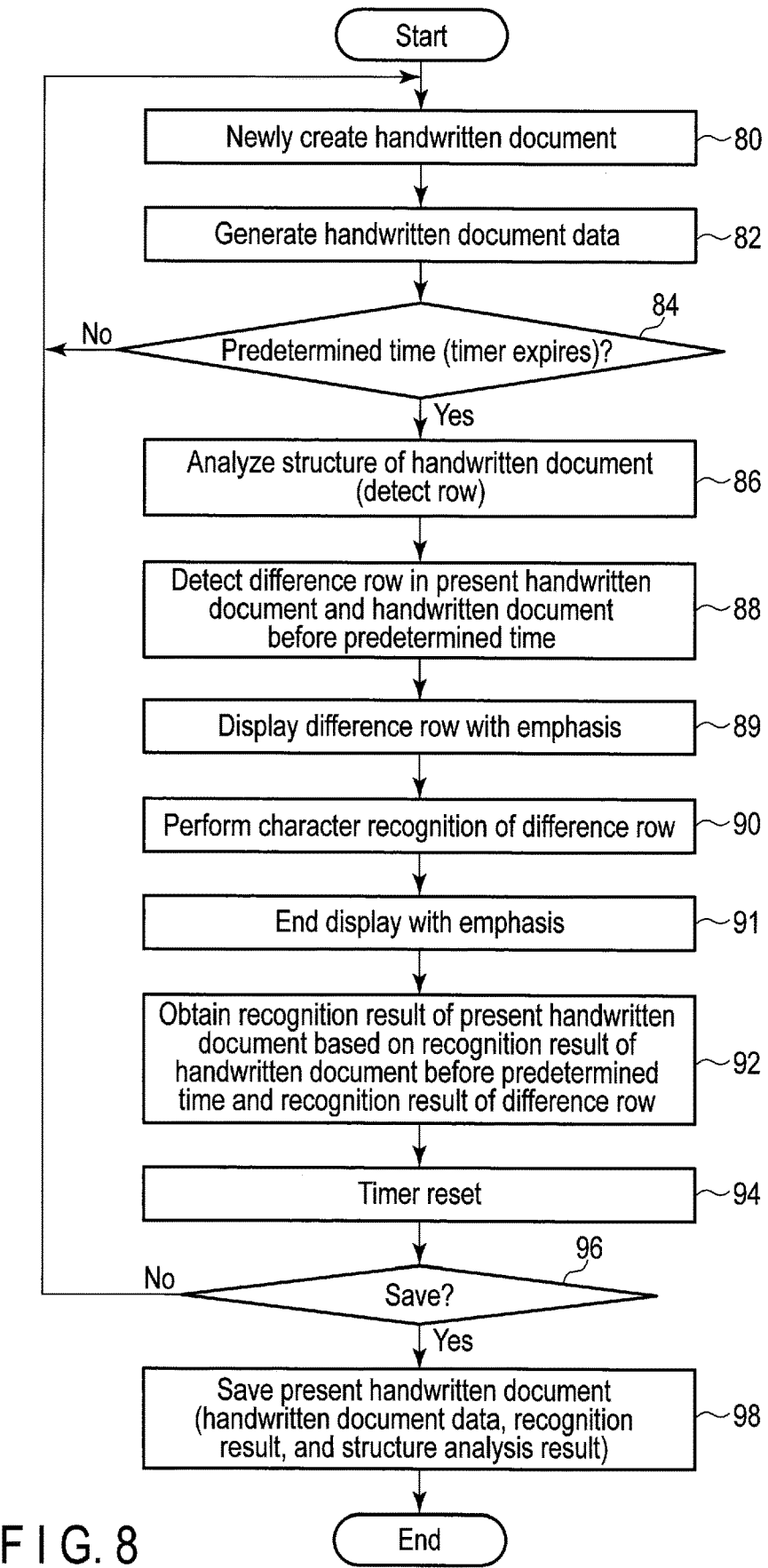
FIG. 8 is a flowchart showing another example of the handwriting input process of the embodiment.

FIG. 8 is a flowchart showing an example of an operation performed when a handwritten document is newly created. In block 80, the menu not shown in the figures is displayed, and the user is made to designate the creation of a new document and to perform a handwriting input operation. In block 82, the locus display control module 301 causes the screen of the touch screen display 17 to display one or more strokes input by handwriting, and the handwritten document data generating module 302 receives the above-described coordinate string output from the touch screen display 17, and generates a handwritten document data having the structure described in detail with respect to FIG. 3, based on the coordinate string.

In block 84, it is determined whether a timer, which counts a predetermined time, has expired (or the predetermined time has elapsed). If the predetermined time has not elapsed, blocks 80 and 82 are repeated. A handwritten document once created may be edited meanwhile. To deal with this, present handwritten document data and handwritten document data before the predetermined time are saved on the working memory 401. Whenever the predetermined time has elapsed, the present handwritten document data becomes a handwritten document data before the predetermined time, and present handwritten document data is newly written. If the predetermined time has elapsed, the structure analyzing module 303 analyzes the structure of a present handwritten document and divides a handwritten document data on a page into handwritten document data on respective rows in block 86. In block 88, the difference detecting module 304 obtains the hash values of the stroke data on each row in the present handwritten document and the handwritten document before the predetermined time which are stored in the working memory 401, and detects a difference row. As shown in Table 2, a detection result is written to the working memory 401. "Before edition" and "After edition" in Tables 1 and 2 correspond to "before predetermined time" and "present" in FIG. 8, respectively. In block 89, the document display control module 308 makes the display mode of the row which is different between the present handwritten document and the handwritten document before the predetermined time different from that of the other portions.

In block 90, the character recognizing module 305 performs character recognition of only the row, the hash value of which is different from that in the handwritten document before the predetermined time. When the character recognition is complete, the document display control module 308 causes the display mode of the difference row to return to the original display mode in block 91. That is, the display mode of the difference row is different during the character recognition. Thus, the user can know that the character recognition is being performed.

In block 92, the character recognizing module 305 obtains a recognition result of the present handwritten document data, using a character recognition result of the difference row and a character recognition result of the handwritten document data before the predetermined time on those other than the difference row. This result is stored in the working memory 401 in a format as shown in Table 2. That is, in the working memory 401, the present handwritten document and the handwritten document before the predetermined time are stored at all times.

In block 94, the timer is reset, and the count of the predetermined time is restarted. In block 96, it is determined whether an instruction to save a handwritten document has been given. If the save instruction has not been given, the processing returns to block 80. If the save instruction has been given, the document saving module 306 newly saves the present handwritten document data on the storage medium 402 in block 98. As shown in Table 1, the handwritten document data is composed of stroke data, a hash value, and text data on each row.

In this manner, even if character recognition is performed whenever a predetermined time has elapsed at the time of document creation, only a portion different from that in the handwritten document before the predetermined time is recognized. Thus, effects are produced on a reduction in a processing time of recognition and a saving of power consumption. In addition, the different portion is displayed in a display mode different from that of the other portions during recognition. Thus, the user can understand that edited stroke is being presently recognized.

Figure 9:
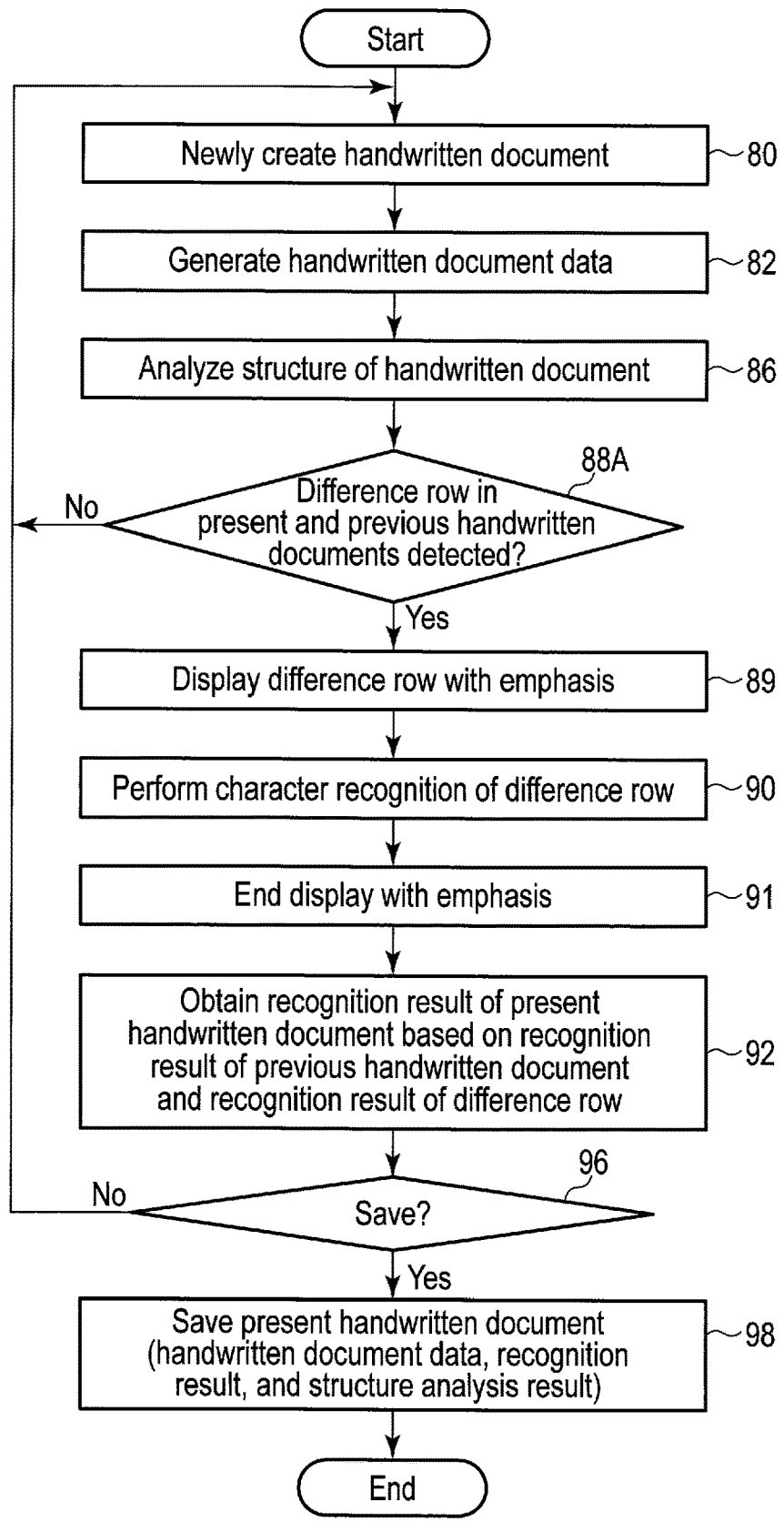
FIG. 9 is a flowchart showing another example of the handwriting input process of the embodiment.

FIG. 9 is a flowchart showing a modification in which character recognition is performed at the time of document creation. In FIG. 8, character recognition is performed whenever a predetermined time has elapsed. On the other hand, in FIG. 9, character recognition is performed whenever a difference row is detected.

In block 80, a handwritten document is newly created. In block 82, a handwritten document data is generated. In block 86, the structure analyzing module 303 analyzes the structure of a present handwritten document, and divides handwritten document data on a page into handwritten document data on respective rows. In block 88A, the difference detecting module 304 obtains the hash values of the stroke data on each row in a present handwritten document and a previous handwritten document which are stored in the working memory 401, and determines whether there is a difference row. If there is a difference row, a detection result thereof is written to the working memory 401 as shown in Table 2. "Before edition" and "After edition" in Tables 1 and 2 correspond to "previous" and "present" in FIG. 9, respectively. If a difference row is not detected, the processing returns to block 80. If a difference row is detected, the document display control module 308 makes the display mode of the row which is different between the present and previous handwritten documents different from that of the other portions in block 89.

In block 90, the character recognizing module 305 performs character recognition of only the row, the hash value of which is different from that in the previous handwritten document. When the character recognition is complete, the document display control module 308 causes the display mode of the difference row to return to the original display mode in block 91. That is, the display mode of the difference row is set to the same display mode as that of the other portions. In block 92, the character recognizing module 305 obtains a recognition result of the present handwritten document data, using a character recognition result of the difference row and a character recognition result of the previous handwritten document data on those other than the difference row. This result is stored in the working memory 401 in a format as shown in Table 2. That is, in the working memory 401, the present handwritten document and the previous handwritten document are stored at all times.

In block 96, it is determined whether an instruction to save a handwritten document has been given. If the save instruction has not been given, the processing returns to block 80. If the save instruction has been given, the document saving module 306 newly saves the present handwritten document data on the storage medium 402 in block 98. As shown in Table 1, the handwritten document data is composed of stroke data, a hash value, and text data on each row.

In this manner, if there is a difference from the previous handwritten document when character recognition is performed at the time of document creation, the re-recognition of only a difference area is performed. For an area including no difference, the character recognition of a present handwritten document is performed using a previous recognition result. Thus, effects are produced on a reduction in a processing time of recognition and a saving of power consumption.

In the case of the edition of a saved document, which has been described with reference to FIG. 6, when an instruction to perform overwrite save is input, a character recognition process is started. However, also in the edition of a saved document, character recognition may be performed whenever a predetermined time has elapsed while the document is being displayed as shown in FIG. 8, or character recognition may be performed whenever a difference area is produced by edition as shown in FIG. 9. In addition, also in the creation of a new document shown in FIG. 8 and FIG. 9, the character recognition process may be started when a save instruction is input as shown in FIG. 6.

Moreover, the timing with which character recognition is started is not limited to the above-described examples, and may be other timings. For example, in an edit mode, when at least a part of a handwritten document is copied into a clipboard or exported to other applications, stroke data may be accompanied with the latest recognition result. For that reason, when a copy command or an export command is input at the time of editing, it is first determined whether the stroke data is accompanied with the latest recognition result or not. The determination can be made based on a time parameter "t" of text data $C_i(t)$, which is a recognition result, shown in Table 2, and the present time. If the stroke data is not accompanied with the latest recognition result, as shown in block 70 and thereafter of FIG. 6, a difference area is detected, and the character recognition of only the difference area is performed. After the latest character recognition result is obtained, the copying into a clipboard or the exportation to other applications is performed.

The processes of the present embodiment can be implemented by a computer program. Thus, the same advantages as those of the present embodiment can be easily achieved by installing the computer program in a computer through a computer-readable storage medium storing the computer program and executing the computer program.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus for performing a character recognition process for plural stroke data in a handwritten document including plural areas, the electronic apparatus comprising: one or more hardware processors configured to:
    store a first handwritten document and first hash values for the plural areas of the first handwritten document in at least a working memory, wherein the first handwritten document is obtained by performing a character recognition process for the handwritten document;
    calculate, at a character recognition process for a second handwritten document which is created by editing the first handwritten document, second hash values for the plural areas of the second handwritten document;
    compare the first hash values in the working memory and the second hash values to detect an area wherein the first hash value is different from the second hash value;
    use, for a first area wherein the first hash value is not different from the second hash value, at least a part of a character recognition result of the first areas of the first handwritten document; and
    use, for a second area wherein the first hash value is different from the second hash value, a result of the character recognition process for the handwritten document.

2. The electronic apparatus of claim 1, wherein
    the working memory is configured to newly store a created handwritten document and overwrite a handwritten document read from the working memory,
    the first handwritten document comprises a document stored in the working memory, and
    the second handwritten document comprises a document to be overwritten in the working memory.

3. The electronic apparatus of claim 1, wherein
the second handwritten document is displayed with displaying the second area in a display mode different from a display mode of another area, and
when the character recognition process for the second area is complete, the display mode of the second area is returned to an original display mode.

4. The electronic apparatus of claim 1, wherein each of the plural areas comprise a row.

5. A method for performing a character recognition process for plural stroke data in a handwritten document including plural areas, the method comprising:
storing a first handwritten document and first hash values for the plural areas of the first handwritten document in at least a working memory, wherein the first handwritten document is obtained by performing a character recognition process for the handwritten document;
calculating, at a character recognition process for a second handwritten document which is created by editing the first handwritten document, second hash values for the plural areas of the second handwritten document;
comparing the first hash values in the working memory and the second hash values to detect an area wherein the first hash value is different from the second hash value;
using, for a first area wherein the first hash value is not different from the second hash value, at least a part of a character recognition result of the first handwritten document; and
using, for a second area wherein the first hash value is different from the second hash value, a result of the character recognition process for the handwritten document.

6. The method of claim 5,
wherein the first handwritten document comprises a document stored in the working memory, and the second handwritten document comprises a document to be overwritten in the working memory.

7. The method of claim 5, further comprising:
displaying the second handwritten document with displaying the second area in a display mode different from a display mode of another stroke, and
returning the display mode of the second area to an original display mode when the character recognition process for the second area is complete.

8. The method of claim 5, wherein each of the plural areas comprise a row.

9. A non-transitory computer-readable storage medium having stored thereon a computer program which performs a character recognition process for plural stroke data in a handwritten document including plural areas, and is executable by a computer, the computer program capable of causing the computer to execute functions of:
storing a first handwritten document and first hash values for the plural areas of the first handwritten document in at least a working memory, wherein the first handwritten document is obtained by performing a character recognition process for the handwritten document;
calculating, at a character recognition process for a second handwritten document which is created by editing the first handwritten document, second hash values for the plural areas of the second handwritten document;
comparing the first hash values in the working memory and the second hash values to detect an area wherein the first hash value is different from the second hash value;
using, for a first area wherein the first hash value is not different from the second hash value, at least a part of a character recognition result of the first handwritten document; and
using, for a second area wherein the first hash value is different from the second hash value, a result of the character recognition process for the handwritten document.

10. The storage medium of claim 9,
wherein the first handwritten document comprises a document stored in the working memory, and the second handwritten document comprises a document to be overwritten in the working memory.

11. The storage medium of claim 9, further comprising:
displaying the second handwritten document with displaying the second area in a display mode different from a display mode of another stroke, and
returning the display mode of the second area to an original display mode when the character recognition process for the second area is complete.

* * * * *